United States Patent [19]

Brune et al.

[11] 4,161,306

[45] Jul. 17, 1979

[54] ELECTRO-MAGNETIC VALVE

[75] Inventors: Gerhard Brüne, Bamberg; Manfred Lembke, Ludwigsburg, both of Fed. Rep. of Germany

[73] Assignee: Robert Bosch GmbH, Stuttgart, Fed. Rep. of Germany

[21] Appl. No.: 727,690

[22] Filed: Sep. 29, 1976

[30] Foreign Application Priority Data

Oct. 31, 1975 [DE] Fed. Rep. of Germany ....... 2548774

[51] Int. Cl.² .................. F16K 31/06; H01F 5/00; H01F 21/28
[52] U.S. Cl. ................................. 251/129; 251/141; 123/32 EF; 123/32 AB; 336/222; 335/299
[58] Field of Search ............... 336/222; 251/129, 141; 335/299; 123/32 ED, 32 EF, 32 AB; 174/126 CP

[56] References Cited

U.S. PATENT DOCUMENTS

| 3,130,355 | 4/1964 | Younger | 335/299 |
| 3,476,128 | 11/1969 | Barker | 251/141 X |
| 3,778,355 | 12/1973 | Johnson et al. | 174/126 CP |

FOREIGN PATENT DOCUMENTS 106992 2/1918 United Kingdom ............... 336/222
244807 12/1925 United Kingdom ............... 336/222

Primary Examiner—Arnold Rosenthal
Attorney, Agent, or Firm—Edwin E. Greigg

[57] ABSTRACT

An electro-magnetic valve having a very fast response and a favorable temperature-gradient characteristic. The valve includes an iron core which carries a stationary magnetic winding within a valve housing, and a plunger coaxially oriented relative to the iron core and separated from the core by an air gap. The magnetic winding is made of a metal having a specific resistance greater than 20 milli-ohms per square millimeter of cross-sectional area per meter length at 20 degrees centigrade. The valve may also include a temperature compensating resistor connected in series with the magnetic winding.

When used in an electronic fuel-injection system for an engine having an even number of cylinders, in which one of these valves is used for each cylinder, these valves can be electrically paired, with one valve of each pair connected in series with the other valve of that pair, and connected to a power source without requiring the use of a compensating resistor in series with the magnetic winding of each valve, due to the identical short response time of each valve.

2 Claims, 7 Drawing Figures

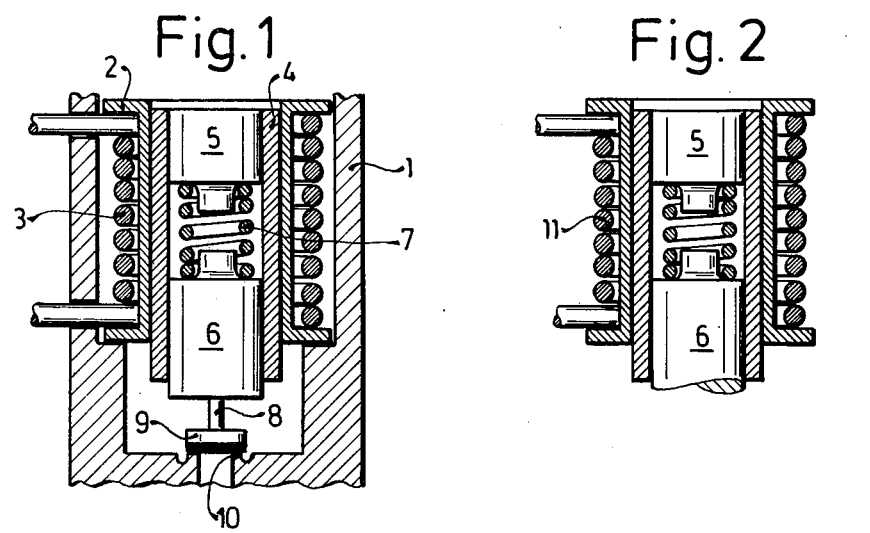
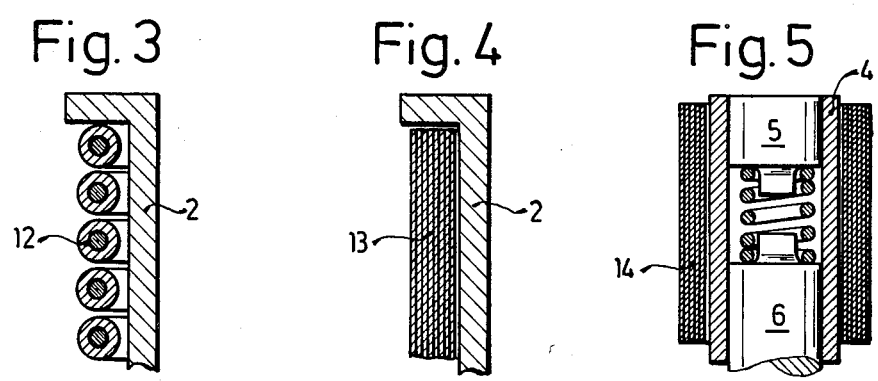
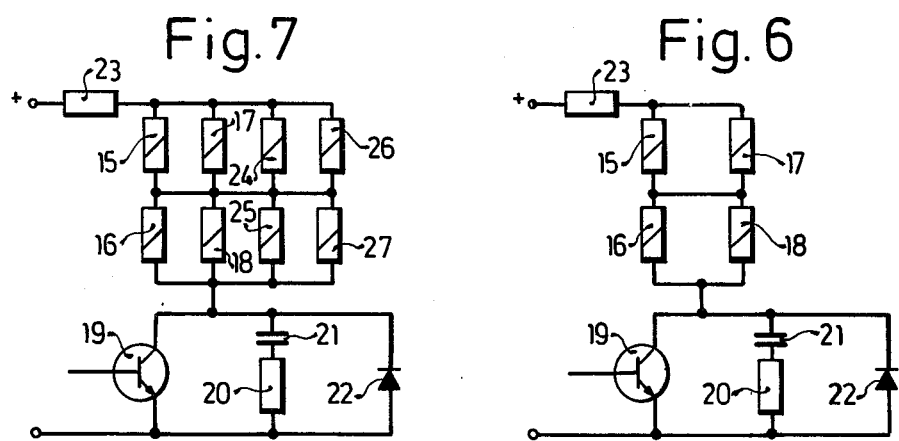

ELECTRO-MAGNETIC VALVE

BACKGROUND OF THE INVENTION

The invention relates generally to electromagnetic valves, and in particular, to electro-magnetic valves having a very fast response and a favorable temperature-gradient characteristic which are suitable for use in an electronic fuel-injection system for an internal combustion engine.

Similar electromagnetic valves are well known. They are utilized, for example, in electronic fuel-injection systems, in which a temperature compensating resistance is connected in series with each magnetic valve. In this type of circuit, the winding of the electro-magnetic valve typically has a resistance of 2.35 ohms, and the compensating resistor typically has a resistance of 6 ohms. This well-known arrangement possesses the advantage of having a fast response, and a low temperature-rise, of the magnetic coil, because only a small portion of the total electrical energy transformed into heat in the magnetic winding and in the compensating resistor takes place in the valve.

If, in addition, the compensating resistor is made of constantan, the combined resistance (the resistance of the magnetic coil plus the compensating resistance) yields favorable temperature-gradient characteristics. However, this method of construction entails the disadvantage that the constantan compensating resistor is very expensive because it is a precision component, and because it has a very high power-consumption.

OBJECTS AND SUMMARY OF THE INVENTION

It is an object of the present invention to disclose an electro-magnetic valve having a very fast response and a favorable temperature-gradient characteristic in which the power consumption in the magnetic valve itself is greater, and the power consumption in the temperature compensating resistor is less than that of known similar valves described above.

It is a further object to disclose an electronic fuel-injection system using the electro-magnetic valves disclosed herein, wherein the individual valves do not require any temperature compensating resistor.

These, and other objects are achieved, according to the present invention, by the fact that the magnetic coil is made of a metal having a specific resistance greater than 20 milli-ohms per square millimeter of cross-section per meter length, at 20 degrees centigrade.

In an embodiment of this invention, in which these electro-magnetic valves are used as fuel-injection valves in an electronic fuel-injection system for an internal combustion engine having preferable an even number of cylinders, at least two magnetic valves are electrically grouped together, respectively one in series with the other, and several of such paired valve groups are connected together in parallel. In such a system, there is no need for these valves to include compensating resistors, due to the identical short response time of each valve.

BRIEF DESCRIPTION OF THE DRAWINGS

Various embodiments of the invention are depicted in the drawings as follows:

FIG. 1 shows an electro-magnetic valve having a magnetic winding made of brass wire, in a cross-sectional view;

FIG. 2 shows a magnetic winding made of aluminum wire in a cross-sectional view;

FIG. 3 shows a magnetic winding made of copper-plated aluminum wire, in a partial, cross-sectional view;

FIG. 4 shows a magnetic winding made of aluminum foil, in a partial, cross-sectional view;

FIG. 5 shows a self-supporting magnetic winding, made of a metal foil, in a cross-sectional view;

FIG. 6 is an electrical schematic of a circuit arrangement of electro-magnetic valves used as the electro-magnetic injection-valves for four cylinder engine; and FIG. 7 is an electrical schematic of a circuit arrangement of electro-magnetic valves used as the electro-magnetic injection-valves for an eight-cylinder engine.

DESCRIPTION OF THE PREFERRED EMBODIMENTS

The electro-magnetic valve shown in FIG. 1 has a valve housing 1, containing coil carrier 2 which carries a magnetic winding 3, henceforth referred to as the "coil". Within the coil carrier 2 lies a magnetic plunger guidetube 4 having a fixed iron core 5, and serving as a guide for a plunger 6 located coaxial to the iron core 5, and separated from it by an air gap. Between the plunger 6 and the core 5 lies a return spring 7. The plunger 6 includes a short rod 8 carrying a plate-shaped valve closure body 9, which cooperates with a valve 9, 10. When the coil 3 carries no current, the magnetic valve is in its rest position, and the valve 9, 10 is closed. Once a current is applied and flows through the coil 3, the magnetic force draws the plunger 6 toward the iron core 5 against the force of the return spring 7, lifting the closure body 9 off the seat 10 and opening the valve 9, 10. When the current is shut off, the spring 7 exerts a force to return the plunger 6 to its rest position and press the closure body 9 against its seat 10, thus closing the valve 9, 10.

In the embodiment shown in FIG. 1, the winding of the coil 3 is made of brass wire. Brass has a specific resistance of 67 milli-ohms per square millimeter per meter length at 20 degrees centigrade. Thus, the power output of this magnetic valve is increased substantially, compared to a coil made of copper wire having a specific resistance of 17.5 milli-ohms per square millimeter per meter length at 20 degrees centigrade, resulting in an appreciable reduction in the valve switching time spans. The total power balance of the output stage thus becomes more favorable.

FIG. 2, wherein the given component part numbers are the same as those used, correspondingly, in the embodiment according to FIG. 1, shows a coil 11, whose winding is made of aluminum wire. Aluminum has a specific resistance of 28 milli-ohms per square millimeter per meter length, at 20 degrees centigrade; hence the use of this kind of wire also increase the power output compared to a coil made of copper wire.

FIG. 3 depicts a coil 12 made of copper-plated aluminum wire; the specific resistance of such a wire also exceeds 20 milli-ohms per square millimeter per meter length at 20 degrees centigrade.

A coil 13, as depicted in FIG. 4 is made of aluminum foil. The aluminum foil is, for example, 12 millimeters wide, and has a thickness of approximately 0.01 millimeter. The foil winding is fashioned after the manner of construction of a wound cpacitor; however, it is obvious that an aluminum foil may also be differently would into a coil. The insulation of adjacent foil strata is achieved with the aid of a synthetic separator sheet, but may optionally be provided by an anodic oxidation of the foil surfaces.

A foil winding of the above-described type possesses the advantages of having a better fill factor, higher heat tolerance, better heat conduction to the exterior, lower inductance, shorter response times, and a lower turn-off peak voltage than a conventional wire winding.

As shown in FIG. 5, the coil carrier may be entirely eliminated when the coil 14 is made of a metal foil; the coil 14 is intrinsically self-supporting thus obviating the need for any carrier.

FIG. 6 shows the arrangement of the output stage circuit of an electronic fuel-injection system for a four-cylinder engine. Four magnetic valves 15, 16, 17 and 18 are used, of which 15 and 16, and 17 and 18, respectively, are connected together in series, and each pair of series-connected valves are connected in parallel. Each of these valves has a high resistance coil, for example, one of the coils depicted in the embodiments shown in FIGS. 1-5.

To the magnetic valves 15, 16, 17 and 18 are further connected a transistor 19, a resistor 20 in series with a capacitor 21, and a diode 22; a temperature-dependent resistor 23, connected in series to the magnetic valves, is a so called NTC resistor having a negative temperature coefficient, whose only purpose is to compensate for the positive temperature coefficients of the coils 3, 11, 12 and 14. The NTC resistor is not made of the expensive constantan, but rather of a cheaper material, and features a very low power consumption. This NTC resistor is advantageously exposed to the same ambient temperatures as are the magnetic valves, that is, for example, to the engine heat. It may, in practice, be even more useful to allocate one NTC resistor to each magnetic valve, in order to gauge more accurately the heat conditions in the immediate proximity of any given magnetic valve.

FIG. 7 shows a circuit similar to that of FIG. 6, for an eight-cylinder engine. Here, too, at least two given magnetic valves are connected in series, and several, specifically four, such paired valve groups are connected together in parallel (magnetic valves 15-18 and 24-27). In a similar manner, engines having other total numbers of cylinders may also be advantageously equipped.

The potential applications for this kind of magnetic valve are numerous, as the field stretches all the way from general vehicular technology to miniaturized hydraulic apparatus and systems.

What is claimed is:

1. An electro-magnetic valve which includes valve means, a valve housing, an iron core disposed along a principal axis within the valve housing, a plunger means coaxially oriented relative to the iron core and separated therefrom by an air gap, said plunger means being movable along the principal axis to open and close the valve means, a stationary magnetic winding means including a magnetic winding and a winding bobbin disposed concentrically about the principal axis for moving the plunger toward the iron core, means for moving the plunger means away from the iron core, and a temperature compensating resistance connected to the magnetic winding means, the improvement wherein the magnetic winding is made of brass wire having a specific resistance greater than 20 milli-ohms per square millimeter of cross-section per meter length at a temperature of 20 degrees centigrade.

2. An electro-magnetic valve which includes valve means, a valve housing, an iron core disposed along a principal axis within the valve housing, a plunger means coaxially oriented relative to the iron core and separated therefrom by an air gap, said plunger means being movable along the principal axis to open and close the valve means, a stationary magnetic winding means including a magnetic winding and a winding bobbin disposed concentrically about the principal axis for moving the plunger toward the iron core, means for moving the plunger means away from the iron core, and a temperature compensating resistance connected to the magnetic winding means, the improvement wherein the magnetic winding is made of copper-plated aluminum wire having a specific resistance greater than 20 milli-ohms per square millimeter of cross-section per meter length at a temperature of 20 degrees centigrade.

* * * * *